US008117244B2

(12) United States Patent
Marinov et al.

(10) Patent No.: US 8,117,244 B2
(45) Date of Patent: Feb. 14, 2012

(54) NON-DISRUPTIVE FILE MIGRATION

(75) Inventors: Borislav Marinov, Aliso Viejo, CA (US); Thomas K. Wong, Pleasanton, CA (US); Vladan Z. Marinkovic, Woodland Hills, CA (US); Ron S. Vogel, San Jose, CA (US)

(73) Assignee: F5 Networks, Inc., Seattle, WA (US)

( * ) Notice: Subject to any disclaimer, the term of this patent is extended or adjusted under 35 U.S.C. 154(b) by 307 days.

(21) Appl. No.: 12/268,718

(22) Filed: Nov. 11, 2008

(65) Prior Publication Data

US 2009/0254592 A1 Oct. 8, 2009

Related U.S. Application Data

(60) Provisional application No. 60/987,206, filed on Nov. 12, 2007.

(51) Int. Cl.
*G06F 17/30* (2006.01)
(52) U.S. Cl. .................. 707/827; 707/828; 707/999.201
(58) Field of Classification Search .................. 707/809, 707/822, 825–828, 999.201, 999.204; 709/213, 709/214
See application file for complete search history.

(56) References Cited

U.S. PATENT DOCUMENTS

| 4,993,030 A | 2/1991 | Krakauer et al. |
| 5,218,695 A | 6/1993 | Noveck et al. |
| 5,303,368 A | 4/1994 | Kotaki |
| 5,473,362 A | 12/1995 | Fitzgerald et al. |
| 5,511,177 A | 4/1996 | Kagimasa et al. |
| 5,537,585 A | 7/1996 | Blickenstaff et al. |
| 5,548,724 A | 8/1996 | Akizawa et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,649,194 A | 7/1997 | Miller et al. |
| 5,649,200 A | 7/1997 | Leblang et al. |
| 5,692,180 A | 11/1997 | Lee |
| 5,721,779 A | 2/1998 | Funk |
| 5,724,512 A | 3/1998 | Winterbottom |

(Continued)

FOREIGN PATENT DOCUMENTS

AU 2003300350 A1 7/2004

(Continued)

OTHER PUBLICATIONS

Basney, Jim et al., "Credential Wallets: A Classification of Credential Repositories Highlighting MyProxy," TPRC 2003, Sep. 19-21, 2003.

(Continued)

*Primary Examiner* — Marc Filipczyk
(74) *Attorney, Agent, or Firm* — LeClairRyan

(57) ABSTRACT

A non-distruptive migration of a native volume from a source server to a destination server performed by a file switch involves converting the source native volume to a native with metadata volume. The native with metadata volume is converted to a mirrored native with metadata volume including the source server and the destination server. The destination server includes a mirror copy of the native with metadata volume. The source server is removed from the mirrored native with metadata volume. The mirror copy of the native with metadata volume on the destination server is converted to a destination native volume on the destination server.

27 Claims, 6 Drawing Sheets

U.S. PATENT DOCUMENTS

| | | | |
|---|---|---|---|
| 5,806,061 A | 9/1998 | Chaudhuri et al. | |
| 5,832,496 A | 11/1998 | Anand et al. | |
| 5,832,522 A | 11/1998 | Blickenstaff et al. | |
| 5,838,970 A | 11/1998 | Thomas | |
| 5,862,325 A | 1/1999 | Reed et al. | |
| 5,884,303 A | 3/1999 | Brown | |
| 5,893,086 A | 4/1999 | Schmuck et al. | |
| 5,897,638 A | 4/1999 | Lasser et al. | |
| 5,905,990 A | 5/1999 | Inglett | |
| 5,917,998 A | 6/1999 | Cabrera et al. | |
| 5,920,873 A | 7/1999 | Van Huben et al. | |
| 5,937,406 A | 8/1999 | Balabine et al. | |
| 5,999,664 A | 12/1999 | Mahoney et al. | |
| 6,012,083 A | 1/2000 | Savitzky et al. | |
| 6,029,168 A | 2/2000 | Frey | |
| 6,044,367 A | 3/2000 | Wolff | |
| 6,047,129 A | 4/2000 | Frye | |
| 6,072,942 A | 6/2000 | Stockwell et al. | |
| 6,078,929 A | 6/2000 | Rao | |
| 6,085,234 A | 7/2000 | Pitts et al. | |
| 6,128,627 A | 10/2000 | Mattis et al. | |
| 6,128,717 A | 10/2000 | Harrison et al. | |
| 6,161,145 A | 12/2000 | Bainbridge et al. | |
| 6,161,185 A | 12/2000 | Guthrie et al. | |
| 6,181,336 B1 | 1/2001 | Chiu et al. | |
| 6,223,206 B1 | 4/2001 | Dan et al. | |
| 6,233,648 B1 | 5/2001 | Tomita | |
| 6,256,031 B1 | 7/2001 | Meijer et al. | |
| 6,282,610 B1 | 8/2001 | Bergsten | |
| 6,289,345 B1 | 9/2001 | Yasue | |
| 6,308,162 B1 | 10/2001 | Ouimet et al. | |
| 6,324,581 B1 | 11/2001 | Xu et al. | |
| 6,339,785 B1 | 1/2002 | Feigenbaum | |
| 6,349,343 B1 | 2/2002 | Foody et al. | |
| 6,374,263 B1 | 4/2002 | Bunger et al. | |
| 6,389,433 B1 | 5/2002 | Bolosky et al. | |
| 6,393,581 B1 | 5/2002 | Friedman et al. | |
| 6,397,246 B1 | 5/2002 | Wolfe | |
| 6,412,004 B1 | 6/2002 | Chen et al. | |
| 6,438,595 B1 | 8/2002 | Blumenau et al. | |
| 6,477,544 B1 | 11/2002 | Bolosky et al. | |
| 6,487,561 B1 | 11/2002 | Ofek et al. | |
| 6,493,804 B1 | 12/2002 | Soltis et al. | |
| 6,516,350 B1 | 2/2003 | Lumelsky et al. | |
| 6,516,351 B2 | 2/2003 | Borr | |
| 6,549,916 B1 | 4/2003 | Sedlar | |
| 6,553,352 B2 | 4/2003 | Delurgio et al. | |
| 6,556,997 B1 | 4/2003 | Levy | |
| 6,556,998 B1 | 4/2003 | Mukherjee et al. | |
| 6,601,101 B1 | 7/2003 | Lee et al. | |
| 6,612,490 B1 | 9/2003 | Herrendoerfer et al. | |
| 6,721,794 B2 | 4/2004 | Taylor et al. | |
| 6,738,790 B1 | 5/2004 | Klein et al. | |
| 6,742,035 B1 | 5/2004 | Zayas et al. | |
| 6,748,420 B1 | 6/2004 | Quatrano et al. | |
| 6,757,706 B1 | 6/2004 | Dong et al. | |
| 6,775,673 B2 | 8/2004 | Mahalingam et al. | |
| 6,775,679 B2 | 8/2004 | Gupta | |
| 6,782,450 B2 | 8/2004 | Arnott et al. | |
| 6,801,960 B1 | 10/2004 | Ericson et al. | |
| 6,826,613 B1 | 11/2004 | Wang et al. | |
| 6,839,761 B2 | 1/2005 | Kadyk et al. | |
| 6,847,959 B1 | 1/2005 | Arrouye et al. | |
| 6,847,970 B2 | 1/2005 | Keller et al. | |
| 6,850,997 B1 | 2/2005 | Rooney et al. | |
| 6,889,249 B2 | 5/2005 | Miloushev et al. | |
| 6,922,688 B1 | 7/2005 | Frey, Jr. | |
| 6,934,706 B1 | 8/2005 | Mancuso et al. | |
| 6,938,039 B1 | 8/2005 | Bober et al. | |
| 6,938,059 B2 | 8/2005 | Tamer et al. | |
| 6,959,373 B2 | 10/2005 | Testardi | |
| 6,961,815 B2 | 11/2005 | Kistler et al. | |
| 6,973,455 B1 | 12/2005 | Vahalia et al. | |
| 6,973,549 B1 | 12/2005 | Testardi | |
| 6,985,936 B2 | 1/2006 | Agarwalla et al. | |
| 6,985,956 B2 | 1/2006 | Luke et al. | |
| 6,986,015 B2 | 1/2006 | Testardi | |
| 6,990,547 B2 | 1/2006 | Ulrich et al. | |
| 6,990,667 B2 | 1/2006 | Ulrich et al. | |
| 6,996,841 B2 | 2/2006 | Kadyk et al. | |
| 7,010,553 B2 | 3/2006 | Chen et al. | |
| 7,013,379 B1 | 3/2006 | Testardi | |
| 7,051,112 B2 | 5/2006 | Dawson | |
| 7,072,917 B2 | 7/2006 | Wong et al. | |
| 7,089,286 B1 | 8/2006 | Malik | |
| 7,111,115 B2 | 9/2006 | Peters et al. | |
| 7,113,962 B1 | 9/2006 | Kee et al. | |
| 7,120,746 B2 | 10/2006 | Campbell et al. | |
| 7,127,556 B2 | 10/2006 | Blumenau et al. | |
| 7,133,967 B2 | 11/2006 | Fujie et al. | |
| 7,146,524 B2 | 12/2006 | Patel et al. | |
| 7,155,466 B2 | 12/2006 | Rodriguez et al. | |
| 7,165,095 B2 | 1/2007 | Sim | |
| 7,167,821 B2 | 1/2007 | Hardwick et al. | |
| 7,173,929 B1 | 2/2007 | Testardi | |
| 7,194,579 B2 | 3/2007 | Robinson et al. | |
| 7,234,074 B2 | 6/2007 | Cohn et al. | |
| 7,280,536 B2 | 10/2007 | Testardi | |
| 7,284,150 B2 | 10/2007 | Ma et al. | |
| 7,293,097 B2 | 11/2007 | Borr | |
| 7,293,099 B1 | 11/2007 | Kalajan | |
| 7,293,133 B1 | 11/2007 | Colgrove et al. | |
| 7,346,664 B2 | 3/2008 | Wong et al. | |
| 7,383,288 B2 * | 6/2008 | Miloushev et al. | 1/1 |
| 7,401,220 B2 | 7/2008 | Bolosky et al. | |
| 7,406,484 B1 | 7/2008 | Srinivasan et al. | |
| 7,415,488 B1 | 8/2008 | Muth et al. | |
| 7,415,608 B2 | 8/2008 | Bolosky et al. | |
| 7,440,982 B2 | 10/2008 | Lu et al. | |
| 7,475,241 B2 | 1/2009 | Patel et al. | |
| 7,477,796 B2 | 1/2009 | Sasaki et al. | |
| 7,509,322 B2 | 3/2009 | Miloushev et al. | |
| 7,512,673 B2 | 3/2009 | Miloushev et al. | |
| 7,519,813 B1 | 4/2009 | Cox et al. | |
| 7,562,110 B2 | 7/2009 | Miloushev et al. | |
| 7,571,168 B2 | 8/2009 | Bahar et al. | |
| 7,574,433 B2 | 8/2009 | Engel | |
| 7,599,941 B2 | 10/2009 | Bahar et al. | |
| 7,610,307 B2 | 10/2009 | Havewala et al. | |
| 7,624,109 B2 | 11/2009 | Testardi | |
| 7,639,883 B2 | 12/2009 | Gill | |
| 7,653,699 B1 | 1/2010 | Colgrove et al. | |
| 7,734,603 B1 | 6/2010 | McManis | |
| 7,788,335 B2 | 8/2010 | Miloushev et al. | |
| 7,822,939 B1 | 10/2010 | Veprinsky et al. | |
| 7,831,639 B1 | 11/2010 | Panchbudhe et al. | |
| 7,870,154 B2 * | 1/2011 | Shitomi et al. | 707/781 |
| 7,877,511 B1 | 1/2011 | Berger et al. | |
| 7,885,970 B2 | 2/2011 | Lacapra | |
| 7,913,053 B1 | 3/2011 | Newland | |
| 7,958,347 B1 | 6/2011 | Ferguson | |
| 8,005,953 B2 * | 8/2011 | Miloushev et al. | 709/225 |
| 2001/0014891 A1 | 8/2001 | Hoffert et al. | |
| 2001/0047293 A1 | 11/2001 | Waller et al. | |
| 2001/0051955 A1 | 12/2001 | Wong | |
| 2002/0035537 A1 | 3/2002 | Waller et al. | |
| 2002/0065810 A1 | 5/2002 | Bradley | |
| 2002/0073105 A1 | 6/2002 | Noguchi et al. | |
| 2002/0083118 A1 | 6/2002 | Sim | |
| 2002/0106263 A1 | 8/2002 | Winker | |
| 2002/0120763 A1 | 8/2002 | Miloushev et al. | |
| 2002/0133330 A1 | 9/2002 | Loisey et al. | |
| 2002/0133491 A1 | 9/2002 | Sim et al. | |
| 2002/0138502 A1 | 9/2002 | Gupta | |
| 2002/0147630 A1 | 10/2002 | Rose et al. | |
| 2002/0150253 A1 | 10/2002 | Brezak et al. | |
| 2002/0161911 A1 | 10/2002 | Pinckney, III et al. | |
| 2002/0188667 A1 | 12/2002 | Kirnos | |
| 2003/0009429 A1 | 1/2003 | Jameson | |
| 2003/0028514 A1 | 2/2003 | Lord et al. | |
| 2003/0033308 A1 | 2/2003 | Patel et al. | |
| 2003/0033535 A1 | 2/2003 | Fisher et al. | |
| 2003/0061240 A1 | 3/2003 | McCann et al. | |
| 2003/0115218 A1 | 6/2003 | Bobbitt et al. | |
| 2003/0115439 A1 | 6/2003 | Mahalingam et al. | |
| 2003/0135514 A1 | 7/2003 | Patel et al. | |
| 2003/0149781 A1 | 8/2003 | Yared et al. | |

| | | |
|---|---|---|
| 2003/0159072 A1 | 8/2003 | Bellinger et al. |
| 2003/0171978 A1 | 9/2003 | Jenkins et al. |
| 2003/0177388 A1 | 9/2003 | Botz et al. |
| 2003/0204635 A1 | 10/2003 | Ko et al. |
| 2004/0003266 A1 | 1/2004 | Moshir et al. |
| 2004/0006575 A1 | 1/2004 | Visharam et al. |
| 2004/0010654 A1 | 1/2004 | Yasuda et al. |
| 2004/0025013 A1 | 2/2004 | Parker et al. |
| 2004/0028043 A1 | 2/2004 | Maveli et al. |
| 2004/0028063 A1 | 2/2004 | Roy et al. |
| 2004/0030857 A1 | 2/2004 | Krakirian et al. |
| 2004/0054777 A1 | 3/2004 | Ackaouy et al. |
| 2004/0098383 A1 | 5/2004 | Tabellion et al. |
| 2004/0133573 A1 | 7/2004 | Miloushev et al. |
| 2004/0133577 A1 | 7/2004 | Miloushev et al. |
| 2004/0133606 A1 | 7/2004 | Miloushev et al. |
| 2004/0133607 A1 | 7/2004 | Miloushev et al. |
| 2004/0133650 A1 | 7/2004 | Miloushev et al. |
| 2004/0139355 A1 | 7/2004 | Axel et al. |
| 2004/0148380 A1 | 7/2004 | Meyer et al. |
| 2004/0153479 A1 | 8/2004 | Mikesell et al. |
| 2004/0181605 A1 | 9/2004 | Nakatani et al. |
| 2004/0236798 A1 | 11/2004 | Srinivasan et al. |
| 2004/0267830 A1 | 12/2004 | Wong et al. |
| 2005/0021615 A1 | 1/2005 | Arnott et al. |
| 2005/0050107 A1 | 3/2005 | Mane et al. |
| 2005/0091214 A1 | 4/2005 | Probert et al. |
| 2005/0108575 A1 | 5/2005 | Yung |
| 2005/0114291 A1 | 5/2005 | Becker-Szendy et al. |
| 2005/0187866 A1 | 8/2005 | Lee |
| 2005/0246393 A1 | 11/2005 | Coates et al. |
| 2005/0289109 A1 | 12/2005 | Arrouye et al. |
| 2005/0289111 A1 | 12/2005 | Tribble et al. |
| 2006/0075475 A1 | 4/2006 | Boulos et al. |
| 2006/0080353 A1 | 4/2006 | Miloushev et al. |
| 2006/0106882 A1 | 5/2006 | Douceur et al. |
| 2006/0112151 A1 | 5/2006 | Manley et al. |
| 2006/0123062 A1 | 6/2006 | Bobbitt et al. |
| 2006/0161518 A1 | 7/2006 | Lacapra |
| 2006/0167838 A1 | 7/2006 | Lacapra |
| 2006/0184589 A1 | 8/2006 | Lees et al. |
| 2006/0190496 A1 | 8/2006 | Tsunoda |
| 2006/0200470 A1 | 9/2006 | Lacapra et al. |
| 2006/0212746 A1 | 9/2006 | Amegadzie et al. |
| 2006/0224687 A1 | 10/2006 | Popkin et al. |
| 2006/0230265 A1 | 10/2006 | Krishna |
| 2006/0259949 A1 | 11/2006 | Schaefer et al. |
| 2006/0271598 A1 | 11/2006 | Wong et al. |
| 2006/0277225 A1 | 12/2006 | Mark et al. |
| 2007/0022121 A1 | 1/2007 | Bahar et al. |
| 2007/0024919 A1 | 2/2007 | Wong et al. |
| 2007/0027929 A1 | 2/2007 | Whelan |
| 2007/0028068 A1 | 2/2007 | Golding et al. |
| 2007/0088702 A1 | 4/2007 | Fridella et al. |
| 2007/0098284 A1 | 5/2007 | Sasaki et al. |
| 2007/0136308 A1 | 6/2007 | Tsirigotis et al. |
| 2007/0208748 A1 | 9/2007 | Li |
| 2007/0209075 A1 | 9/2007 | Coffman |
| 2007/0226331 A1 | 9/2007 | Srinivasan et al. |
| 2008/0070575 A1 | 3/2008 | Claussen et al. |
| 2008/0104443 A1 | 5/2008 | Akutsu et al. |
| 2008/0209073 A1 | 8/2008 | Tang |
| 2008/0222223 A1 | 9/2008 | Srinivasan et al. |
| 2008/0243769 A1 | 10/2008 | Arbour et al. |
| 2008/0282047 A1 | 11/2008 | Arakawa et al. |
| 2009/0007162 A1 | 1/2009 | Sheehan |
| 2009/0041230 A1 | 2/2009 | Williams |
| 2009/0077097 A1* | 3/2009 | Lacapra et al. ............ 707/10 |
| 2009/0094252 A1 | 4/2009 | Wong et al. |
| 2009/0106255 A1 | 4/2009 | Lacapra et al. |
| 2009/0106263 A1 | 4/2009 | Khalid et al. |
| 2009/0132616 A1 | 5/2009 | Winter et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0254592 A1 | 10/2009 | Marinov et al. |

FOREIGN PATENT DOCUMENTS

| | | |
|---|---|---|
| CA | 2512312 A1 | 7/2004 |
| EP | 0 738 970 A1 | 10/1996 |
| JP | 63010250 A | 1/1988 |
| JP | 06-332782 | 12/1994 |
| JP | 08-328760 | 12/1996 |
| JP | 08-339355 | 12/1996 |
| JP | 9016510 A | 1/1997 |
| JP | 11282741 A | 10/1999 |
| WO | WO 02/056181 A2 | 7/2002 |
| WO | WO 2004/061605 A2 | 7/2004 |
| WO | WO 2008/130983 A1 | 10/2008 |
| WO | WO 2008/147973 A2 | 12/2008 |

OTHER PUBLICATIONS

Botzum, Keys, "Single Sign On—A Contrarian View," Open Group Website, <http://www.opengroup.org/security/topics.htm>, Aug. 6, 2001, pp. 1-8.

Novotny, Jason et al., "An Online Credential Repository for the Grid: MyProxy," 2001, pp. 1-8.

Pashalidis, Andreas et al., "A Taxonomy of Single Sign-On Systems," 2003, pp. 1-16, Royal Holloway, University of London, Egham Surray, TW20, 0EX, United Kingdom.

Pashalidis, Andreas et al., "Impostor: a single sign-on system for use from untrusted devices," Global Telecommunications Conference, 2004, GLOBECOM '04, IEEE, Issue Date: Nov. 29-Dec. 3, 2004. Royal Holloway, University of London.

Tulloch, Mitch, "Microsoft Encyclopedia of Security," pp. 218, 300-301, Microsoft Press, 2003, Redmond, Washington.

"The AFS File System in Distributed Computing Environment," www.transarc.ibm.com/Library/whitepapers/AFS/afsoverview. html, last accessed on Dec. 20, 2002.

Aguilera, Marcos K. et al., "Improving recoverability in multi-tier storage systems," International Conference on Dependable Systems and Networks (DSN-2007), Jun. 2007, 10 pages, Edinburgh, Scotland.

Anderson, Darrell C. et al., "Interposed Request Routing for Scalable Network Storage," ACM Transactions on Computer Systems 20(1): (Feb. 2002), pp. 1-24.

Anderson et al., "Serverless Network File System," in the 15th Symposium on Operating Systems Principles, Dec. 1995, Association for Computing Machinery, Inc.

Anonymous, "How DFS Works: Remote File Systems," Distributed File System (DFS) Technical Reference, retrieved from the Internet on Feb. 13, 2009: URL<:http://technetmicrosoft.com/en-us/library/cc782417WS.10,printer).aspx> (Mar. 2003).

Apple, Inc., "Mac OS X Tiger Keynote Intro. Part 2," Jun. 2004, www.youtube.com <http://www.youtube.com/watch?v=zSBJwEmRJbY>, p. 1.

Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-6.

"Auspex Storage Architecture Guide," Second Edition, 2001, Auspex Systems, Inc., www.auspex.com, last accessed on Dec. 30, 2002.

Cabrera et al., "Swift: Storage Architecture for Large Objects," In Proceedings of the-Eleventh IEEE Symposium on Mass Storage Systems, pp. 123-128, Oct. 1991.

Cabrera et al., "Swift: Using Distributed Disk Striping to Provide High I/O Data Rates," Computing Systems 4, 4 (Fall 1991), pp. 405-436.

Cabrera et al., "Using Data Striping in a Local Area Network," 1992, technical report No. UCSC-CRL-92-09 of the Computer & Information Sciences Department of University of California at Santa Cruz.

Callaghan et al., "NFS Version 3 Protocol Specifications" (RFC 1813), Jun. 1995, The Internet Engineering Task Force (IETN), www.ietf.org, last accessed on Dec. 30, 2002.

Carns et al., "PVFS: A Parallel File System for Linux Clusters," in Proceedings of the Extreme Linux Track: 4th Annual Linux Showcase and Conference, pp. 317-327, Atlanta, Georgia, Oct. 2000, USENIX Association.

Cavale, M. R., "Introducing Microsoft Cluster Service (MSCS) in the Windows Server 2003", Microsoft Corporation, Nov. 2002.

"CSA Persistent File System Technology," Colorado Software Architecture, Inc.: A White Paper, Jan. 1, 1999, p. 1-3, <http://www.cosoa.com/white_papers/pfs.php>.

"Distributed File System: Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 20, 2002.

English Language Abstract of JP 08-328760 from Patent Abstracts of Japan.

English Language Abstract of JP 08-339355 from Patent Abstracts of Japan.

English Translation of paragraphs 17, 32, and 40-52 of JP 08-328760.

English Translation of Notification of Reason(s) for Refusal for JP 2002-556371 (Dispatch Date: Jan. 22, 2007).

Fan et al., "Summary Cache: A Scalable Wide-Area Protocol", Computer Communications Review, Association Machinery, New York, USA, Oct. 1998, vol. 28, Web Cache Sharing for Computing No. 4, pp. 254-265.

Farley, M., "Building Storage Networks," Jan. 2000, McGraw Hill, ISBN 0072120509.

Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997.

Gibson et al., "NASD Scalable Storage Systems," Jun. 1999, USENIX99, Extreme Linux Workshop, Monterey, California.

Harrison, C., May 19, 2008 response to Communication pursuant to Article 96(2) EPC dated Nov. 9, 2007 in corresponding European patent application No. 02718824.2.

Hartman, J., "The Zebra Striped Network File System," 1994, Ph.D. dissertation submitted in the Graduate Division of the University of California at Berkeley.

Haskin et al., "The Tiger Shark File System," 1996, in proceedings of IEEE, Spring COMPCON, Santa Clara, CA, www.research.ibm.com, last accessed on Dec. 30, 2002.

Hu, J., Final Office action dated Sep. 21, 2007 for related U.S. Appl. No. 10/336,784.

Hu, J., Office action dated Feb. 6, 2007 for related U.S. Appl. No. 10/336,784.

Hwang et al., "Designing SSI Clusters with Hierarchical Checkpointing and Single 1/0 Space," IEEE Concurrency, Jan.-Mar. 1999, pp. 60-69.

International Search Report for International Patent Application No. PCT/US2008/083117 (Jun. 23, 2009).

International Search Report for International Patent Application No. PCT/US2008/060449 (Apr. 9, 2008).

International Search Report for International Patent Application No. PCT/US2008/064677 (Sep. 6, 2009).

International Search Report for International Patent Application No. PCT/US02/00720, Jul. 8, 2004.

International Search Report from International Application No. PCT/US03/41202, mailed Sep. 15, 2005.

Karamanolis, C. et al., "An Architecture for Scalable and Manageable File Services," HPL-2001-173, Jul. 26, 2001. p. 1-114.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kimball, C.E. et al., "Automated Client-Side Integration of Distributed Application Servers," 13Th LISA Conf., 1999, pp. 275-282 of the Proceedings.

Klayman, J., Nov. 13, 2008 e-mail to Japanese associate including instructions for response to office action dated May 26, 2008 in corresponding Japanese patent application No. 2002-556371.

Klayman, J., response filed by Japanese associate to office action dated Jan. 22, 2007 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993. (http://www.ietf.org/ rfc/rfc1510.txt?number=1510).

Korkuzas, V., Communication pursuant to Article 96(2) EPC dated Sep. 11, 2007 in corresponding European patent application No. 02718824.2-2201.

Lelil, S., "Storage Technology News: AutoVirt adds tool to help data migration projects," Feb. 25, 2011, last accessed Mar. 17, 2011, <http://searchstorage.techtarget.com/news/article/0,289142,sid5_gci1527986,00.html>.

Long et al., "Swift/RAID: A distributed RAID System", Computing Systems, Summer 1994, vol. 7, pp. 333-359.

"NERSC Tutorials: I/O on the Cray T3E, 'Chapter 8, Disk Striping'," National Energy Research Scientific Computing Center (NERSC), http://hpcfnersc.gov, last accessed on Dec. 27, 2002.

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, Storage Networking Industry Association (SNIA), www.snia.org, last accessed on Mar. 26, 2001.

Patterson et al., "A case for redundant arrays of inexpensive disks (RAID)", Chicago, Illinois, Jun. 1-3, 1998, in Proceedings of ACM SIGMOD conference on the Management of Data, pp. 109-116, Association for Computing Machinery, Inc., www.acm.org, last accessed on Dec. 20, 2002.

Pearson, P.K., "Fast Hashing of Variable-Length Text Strings," Comm. of the ACM, Jun. 1990, vol. 33, No. 6.

Peterson, M., "Introducing Storage Area Networks," Feb. 1998, InfoStor, www.infostor.com, last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14,2000, pp. 169-180 of the Proceedings, www.usenix.org, last accessed on Dec. 20, 2002.

Response filed Jul. 6, 2007 to Office action dated Feb. 6, 2007 for related U.S. Appl. No. 10/336,784.

Response filed Mar. 20, 2008 to Final Office action dated Sep. 21,2007 for related U.S. Appl. No. 10/336,784.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000, pp. 864-873, XP010376176 ISBN: 0/7803-5880-5 p. 867, col. 2, last paragraph -p. 868, col. 1, paragraph 1.

RSYNC, "Welcome to the RSYNC Web Pages," Retrieved from the Internet URL: http://samba.anu.edu.ut.rsync/. (Retrieved on Dec. 18, 2009).

Savage, et al., "Afraid- A Frequently Redundant Array of Independent Disks," 1996 USENIX Technical Conf., San Diego, California, Jan. 22-26, 1996.

"Scaling Next Generation Web Infrastructure with Content-Intelligent Switching: White Paper," Apr. 2000, p. 1-9 Alteon Web Systems, Inc.

Soltis et al., "The Design and Performance of a Shared Disk File System for IRIX," in Sixth NASA Goddard Space Flight Center Conference on Mass Storage and Technologies in cooperation with the Fifteenth IEEE Symposium on Mass Storage Systems, Mar. 23-26, 1998.

Soltis et al., "The Global File System," in Proceedings of the Fifth NASA Goddard Space Flight Center Conference on Mass Storage Systems and Technologies, Sep. 17-19, 1996, College Park, Maryland.

Sorenson, K.M., "Installation and Administration: Kimberlite Cluster Version 1.1.0, Rev. Dec. 2000," Mission Critical Linux, http://oss.missioncriticallinux.com/kimberlite/kimberlite.pdf.

Stakutis, C., "Benefits of SAN-based file system sharing," Jul. 2000, InfoStor, www.infostor.com, last accessed on Dec. 30, 2002.

Thekkath et al., "Frangipani: A Scalable Distributed File System," in Proceedings of the 16th ACM Symposium on Operating Systems Principles, Oct. 1997, Association for Computing Machinery, Inc.

Uesugi, H., Nov. 26, 2008 amendment filed by Japanese associate in response to office action dated May 26, 2008 in corresponding Japanese patent application No. 2002-556371.

Uesugi, H., English translation of office action dated May 26, 2008 in corresponding Japanese patent application No. 2002-556371.

Uesugi, H., Jul. 15, 2008 letter from Japanese associate reporting office action dated May 26, 2008 in corresponding Japanese patent application No. 2002-556371.

"VERITAS SANPoint Foundation Suite(tm) and SANPoint Foundation Suite(tm) HA: New VERITAS Volume Management and File System Technology for Cluster Environments," Sep. 2001, VERITAS Software Corp.

Wilkes, J., et al., "The HP AutoRAID Hierarchical Storage System," ACM Transactions on Computer Systems, Feb. 1996, vol. 14, No. 1.

"Windows Clustering Technologies-An Overview," Nov. 2001, Microsoft Corp., www.microsoft.com, last accessed on Dec. 30, 2002.

Zayas, E., "AFS-3 Programmer's Reference: Architectural Overview," Transarc Corp., version 1.0 of Sep. 2, 1991, doc. No. FS-00-D160.

* cited by examiner

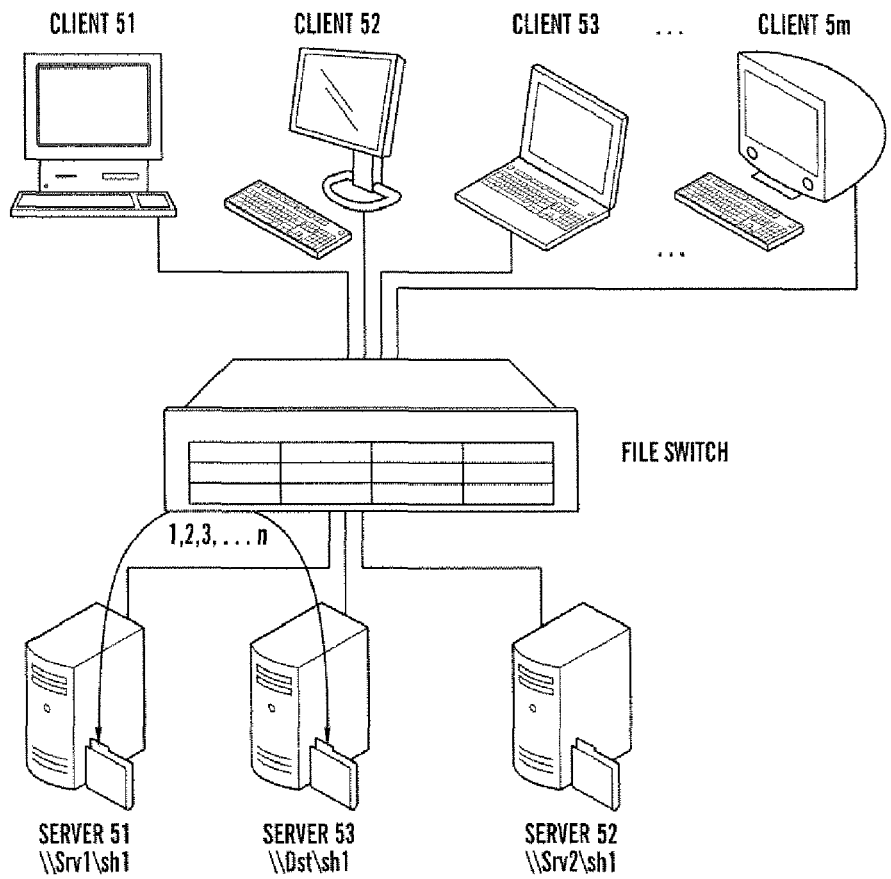

FIG. 5

| GLOBAL NAMESPACE PATH | METADATA INFO | TARGET PATH |
|---|---|---|
| \\MFM\Native\Srv1\Dir1 | \\Srv1\sh1 | \\Srv1\sh1\Dir1 |
| \\MFM\Native\Srv1\Dir2 | \\Srv1\sh1 | \\Srv1\sh1\Dir2 |
| \\MFM\Native\Srv1\Dir2\File1.TXT | \\Srv1\sh1 | \\Srv1\sh1\Dir2\FILE1.TXT |

FIG. 6

| GLOBAL NAMESPACE PATH | METADATA INFO | | TARGET PATH(S) |
| | #MIRRORS | DESTINATION PATH | |
|---|---|---|---|
| \\MFM\Native\Srv1\Dir1 | 1 | \\Srv1\sh1 | \\Srv1\sh1\Dir1 |
| \\MFM\Native\Srv1\Dir2 | 1 | \\Srv1\sh1 | \\Srv1\sh1\Dir2 |
| \\MFM\Native\Srv1\Dir2\File1.TXT | 1 | \\Srv1\sh1 | \\Srv1\sh1\Dir2\File1.TXT |
| \\MFM\Native\Srv1\MirroredDir | 2 | \\Srv1\sh1 \\Dst\sh1 | \\Srv1\sh1\MirroredDir \\Dst\sh1\MirroredDir |
| \\MFM\Native\Srv1\MirroredDir\Mirr.txt | 2 | \\Srv1\sh1 \\Dst\sh1 | \\Srv1\sh1\MirroredDir\Mirr.txt \\Dst\sh1\MirroredDir\Mirr.txt |

FIG. 7

NON-DISRUPTIVE FILE MIGRATION

CROSS-REFERENCE TO RELATED APPLICATIONS

This patent application claims priority from U.S. Provisional Patent Application No. 60/987,206 entitled NON-DISRUPTIVE FILE MIGRATION filed Nov. 12, 2007.

This patent application also may be related to one or more of the following patent applications:

U.S. Provisional Patent Application No. 60/923,765 entitled NETWORK FILE MANAGEMENT SYSTEMS, APPARATUS, AND METHODS filed on Apr. 16, 2007.

U.S. Provisional Patent Application No. 60/940,104 entitled REMOTE FILE VIRTUALIZATION filed on May 25, 2007.

U.S. Provisional Patent Application No. 60/987,161 entitled REMOTE FILE VIRTUALIZATION METADATA MIRRORING filed Nov. 12, 2007.

U.S. Provisional Patent Application No. 60/987,165 entitled REMOTE FILE VIRTUALIZATION DATA MIRRORING filed Nov. 12, 2007.

U.S. Provisional Patent Application No. 60/987,170 entitled REMOTE FILE VIRTUALIZATION WITH NO EDGE SERVERS filed Nov. 12, 2007.

U.S. Provisional Patent Application No. 60/987,174 entitled LOAD SHARING CLUSTER FILE SYSTEM filed Nov. 12, 2007.

U.S. Provisional Patent Application No. 60/987,197 entitled HOTSPOT MITIGATION IN LOAD SHARING CLUSTER FILE SYSTEMS filed Nov. 12, 2007.

U.S. Provisional Patent Application No. 60/987,194 entitled ON DEMAND FILE VIRTUALIZATION FOR SERVER CONFIGURATION MANAGEMENT WITH LIMITED INTERRUPTION filed Nov. 12, 2007.

U.S. Provisional Patent Application No. 60/987,181 entitled FILE DEDUPLICATION USING STORAGE TIERS filed Nov. 12, 2007.

U.S. patent application Ser. No. 12/104,197 entitled FILE AGGREGATION IN A SWITCHED FILE SYSTEM filed Apr. 16, 2008.

U.S. patent application Ser. No. 12/103,989 entitled FILE AGGREGATION IN A SWITCHED FILE SYSTEM filed Apr. 16, 2008.

U.S. patent application Ser. No. 12/126,129 entitled REMOTE FILE VIRTUALIZATION IN A SWITCHED FILE SYSTEM filed May 23, 2008.

All of the above-referenced patent applications are hereby incorporated herein by reference in their entireties.

FIELD OF THE INVENTION

This invention relates generally to storage networks and, more specifically, to a method for migrating file data from one storage server to another in a non-disruptive manner.

BACKGROUND OF THE INVENTION

In a computer network, NAS (Network Attached Storage) file servers provide file services for clients connected in a computer network using networking protocols like CIFS or any other stateful protocol (e.g., NFS-v4). Usually, when a file, directory, or a server share is migrated from one server to another, the administrator takes the server offline, copies the files to the destination server, and finally brings the destination server online. The larger the amount of data been migrated, the longer the clients must wait for the migration to complete, which leads to longer server down-time.

In today's information age of exponentially growing server capacity and clients spread all over the globe, the amount of down-time an administrator can afford is constantly shrinking. It becomes almost impossible to migrate files from one server to another. This forces storage administrators to buy servers with significantly greater capacity (i.e., overprovision) in order to avoid/delay the need of migrating server data to a newer, higher capacity model.

A common approach to migrate files is to start migrating files while the source server is continued to be accessed and gradually copy all files to the destination server. On the subsequent passes only the newly modified files and directories (since the last pass) are copied and so on. This process is repeated until all files are migrated to the destination server. At this point, the source server is taken offline and replaced with the destination server, thus lowering the amount of time needed to migrate from one server to another. Although this solution lowers the down time it does not completely solve the problem with files that are constantly accessed or held open in exclusive mode. For those files, the user still suffers a visible access interruption and will have to invalidate all of its open handles and suffer service interruption during the migration of those files.

SUMMARY OF THE INVENTION

File Virtualization is a very powerful server management tool that normally is used for mirroring and load balancing for virtualized systems. Native Volume with Metadata is the only known way to bring File Virtualization to places where preserving the user's native directory structure is a must. Using File mirroring over Native Volume with Metadata is an excellent way to provide non-disruptive migration for storage servers.

In accordance with one aspect of the invention there is provided a method and file switch for non-disruptive migration of a native mode volume from a source server to a destination server. Such non-disruptive migration involves converting, by the file switch, the source native volume to a native with metadata volume using a local file system managed by the file switch; converting, by the file switch, the native with metadata volume to a mirrored native with metadata volume including the source server and the destination server, the destination server including a mirror copy of the native with metadata volume; removing, by the file switch, the source server from the mirrored native with metadata volume; and converting, by the file switch, the mirror copy of the native with metadata volume on the destination server to a destination native volume on the destination server.

In various alternative embodiments, converting the source native volume to the native with metadata volume may involve for each source directory in the source native volume, creating a corresponding local directory in the local file system including metadata associated with the source directory copied from the source native volume; and for each source file in the source native volume, creating a corresponding local sparse file in the local file system including file attributes copied from the source native volume but excluding the file contents associated with the source file. The metadata associated with the source directory copied from the source native volume may include directory security descriptors. Creating a local directory for a source directory may involve opening the source directory in the source native volume; placing a lock on the source directory; and creating the local directory and its metadata. Converting the native with metadata volume to the mirrored native with metadata volume may involve for each local directory, creating a corresponding destination directory in the destination server and maintaining a mapping of the local directory to a source directory pathname for the corresponding source directory in the source server and to a destination directory pathname for the corresponding destination directory in the destination server; and for each local file, creating a corresponding destination file in the destination server including file data copied from the source native volume and maintaining a mapping of the local file to a source file pathname for the corresponding source file in the source server and to a destination file pathname for the corresponding destination file in the destination server. Each mapping may include an indicator of the number of servers associated with the mirrored native with metadata volume. Removing the source server from the mirrored native with metadata volume may involve disabling usage of the source destination pathnames and the source file pathnames. Converting the mirror copy of the native with metadata volume on the destination server to a destination native volume may involve replicating state information for the destination directories and the destination files from the source native volume; disabling usage of the local directories and local files; and advertising the destination directories and destination files as a native volume. Converting the mirror copy of the native with metadata volume on the destination server to a destination native volume further may involve deleting unneeded metadata associated with the mirror copy of the native with metadata volume from the destination server.

BRIEF DESCRIPTION OF THE DRAWINGS

The foregoing and advantages of the invention will be appreciated more fully from the following further description thereof with reference to the accompanying drawings wherein:

FIG. 5 depicts the process sequence of non-disruptive server migration;

FIG. 6 is a practical example of a sample global namespace including the metadata information and how the global namespace is used to calculate the target path;

FIG. 7 is a practical example of a sample global namespace including the metadata information and how the global namespace is used to calculate the target paths.

Unless the context suggests otherwise, like reference numerals do not necessarily represent like elements.

DETAILED DESCRIPTION OF SPECIFIC EMBODIMENTS

Figure 1:
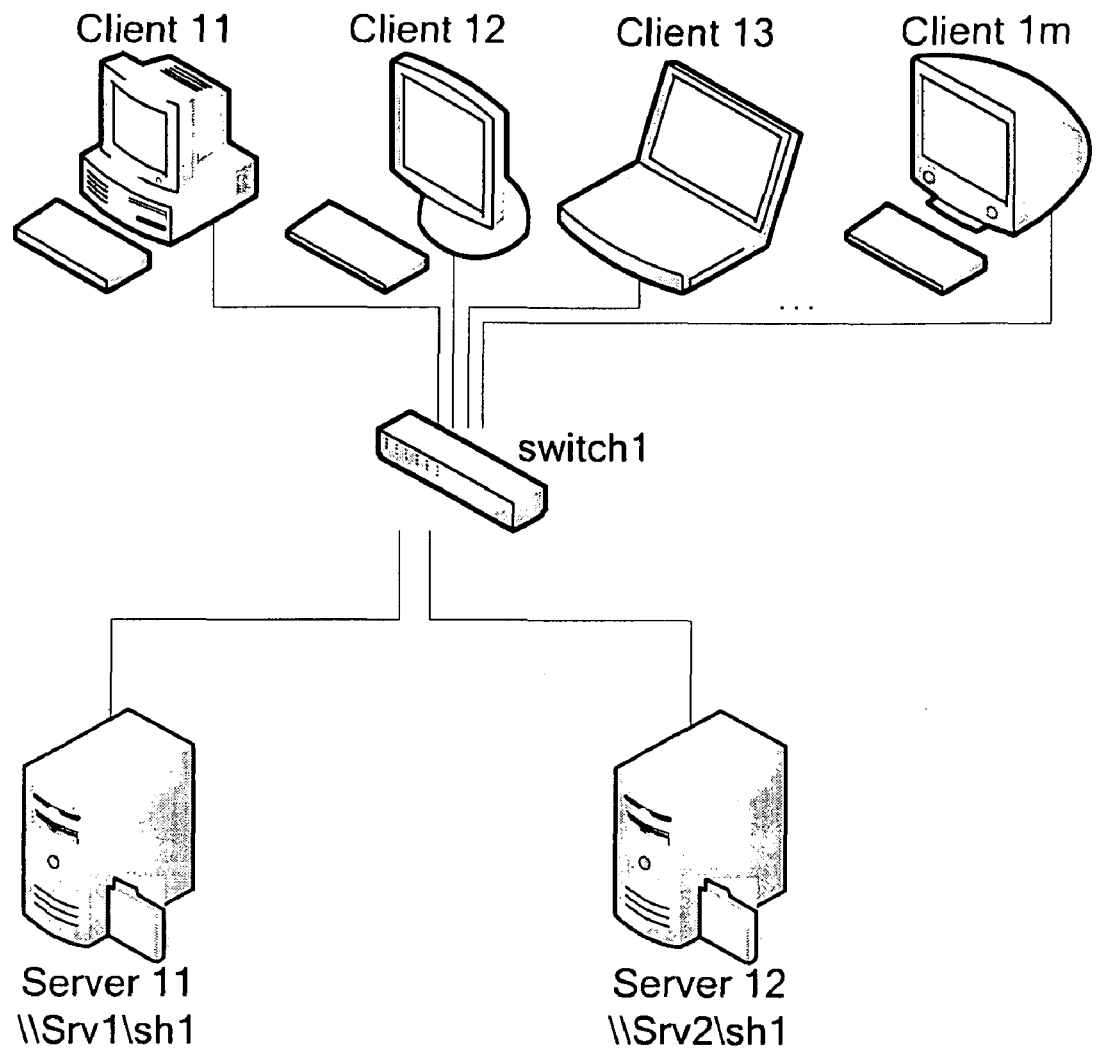
FIG. 1 is a schematic block diagram of a two server system demonstrating file access from multiple clients.

Definitions. As used in this description and related claims, the following terms shall have the meanings indicated, unless the context otherwise requires:

Aggregator. An "aggregator" is a file switch that performs the function of directory, data, or namespace aggregation of a client data file over a file array.

File Switch. A "file switch" is a device (or group of devices) that performs file aggregation, transaction aggregation, and directory aggregation functions, and is physically or logically positioned between a client and a set of file servers. To client devices, the file switch appears to be a file server having enormous storage capabilities and high throughput. To the file servers, the file switch appears to be a client. The file switch directs the storage of individual user files over multiple file servers, using mirroring to improve fault tolerance as well as throughput. The aggregation functions of the file switch are done in a manner that is transparent to client devices. The file switch preferably communicates with the clients and with the file servers using standard file protocols, such as CIFS or NFS. The file switch preferably provides full virtualization of the file system such that data can be moved without changing path names and preferably also allows expansion/contraction/replacement without affecting clients or changing pathnames. Attune System's Maestro File Manager (MFM), which is represented in FIG. 5, is an example of a file switch.

Switched File System. A "switched file system" is defined as a network including one or more file switches and one or more file servers. The switched file system is a file system since it exposes files as a method for sharing disk storage. The switched file system is a network file system, since it provides network file system services through a network file protocol—the file switches act as network file servers and the group of file switches may appear to the client computers as a single file server.

Native File System. A "native file system" is defined as the native file system exposed by the back-end servers.

Native mode. A "native mode" of operation is a mode of operation where the backend file system is exposed to the clients through the file switch such that the file switch completely preserves the directory structure and other metadata of the back end server. Each file server (share) represents a single mount point in the global namespace exposed by the file switch.

File. A file is the main component of a file system. A file is a collection of information that is used by a computer. There are many different types of files that are used for many different purposes, mostly for storing vast amounts of data (i.e., database files, music files, MPEGs, videos). There are also types of files that contain applications and programs used by computer operators as well as specific file formats used by different applications. Files range in size from a few bytes to many gigabytes and may contain any type of data. Formally, a file is a called a stream of bytes (or a data stream) residing on a file system. A file is always referred to by its name within a file system.

User File. A "user file" is the file or file object that a client computer works with (e.g., read, write, etc.), and in some contexts may also be referred to as an "aggregated file." A user file may be mirrored and stored in multiple file servers and/or data files within a switched file system.

File/Directory Metadata. A "file/directory metadata," also referred to as the "the metadata," is a data structure that contains information about the position of a specific file or directory including, but not limited to, the position and placement of the file/directory mirrors and their rank. In embodiments of the present invention, ordinary clients are typically not permitted to directly read or write the content of "the metadata", the clients still have indirect access to ordinary directory information and other metadata, such as file layout information, file length, etc. In fact, in embodiments of the invention, the existence of "the metadata" is transparent to the clients, who need not have any knowledge of "the metadata" and its storage.

Mirror. A "mirror" is a copy of a file. When a file is configured to have two mirrors, that means there are two copies of the file.

Oplock. An oplock, also called an "opportunistic lock" is a mechanism for allowing the data in a file to be cached, typically by the user (or client) of the file. Unlike a regular lock on a file, an oplock on behalf of a first client is automatically broken whenever a second client attempts to access the file in a manner inconsistent with the oplock obtained by the first client. Thus, an oplock does not actually provide exclusive access to a file; rather it provides a mechanism for detecting when access to a file changes from exclusive to shared, and for writing cached data back to the file (if necessary) before enabling shared access to the file.

This provisional patent application relates generally to migrating file data from one storage server to another in a non-disruptive manner using a stateful network file protocol such as CIFS.

Regular Migration

Figure 2:
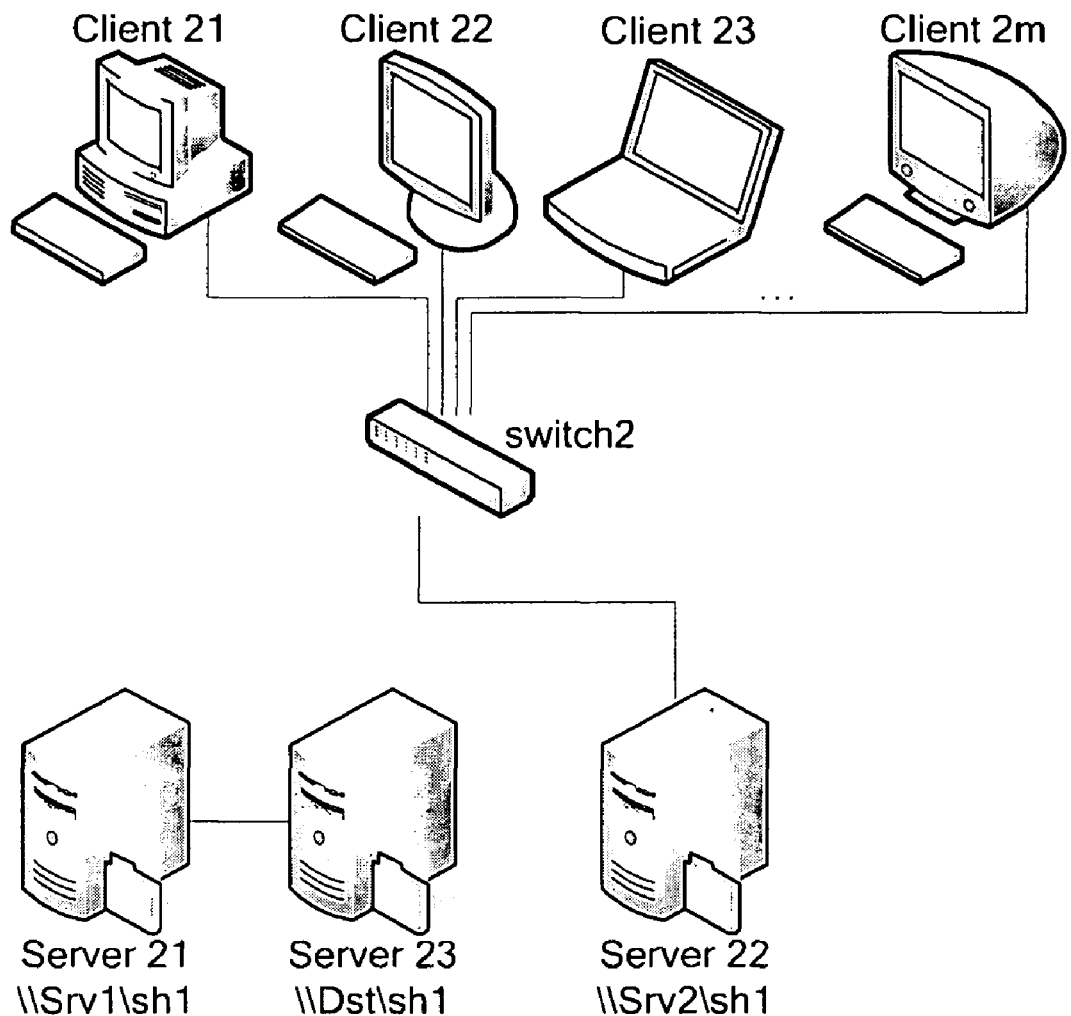
FIG. 2 is a schematic block diagram of a two server system where one of the servers is taken off the grid for migration.
Figure 3:
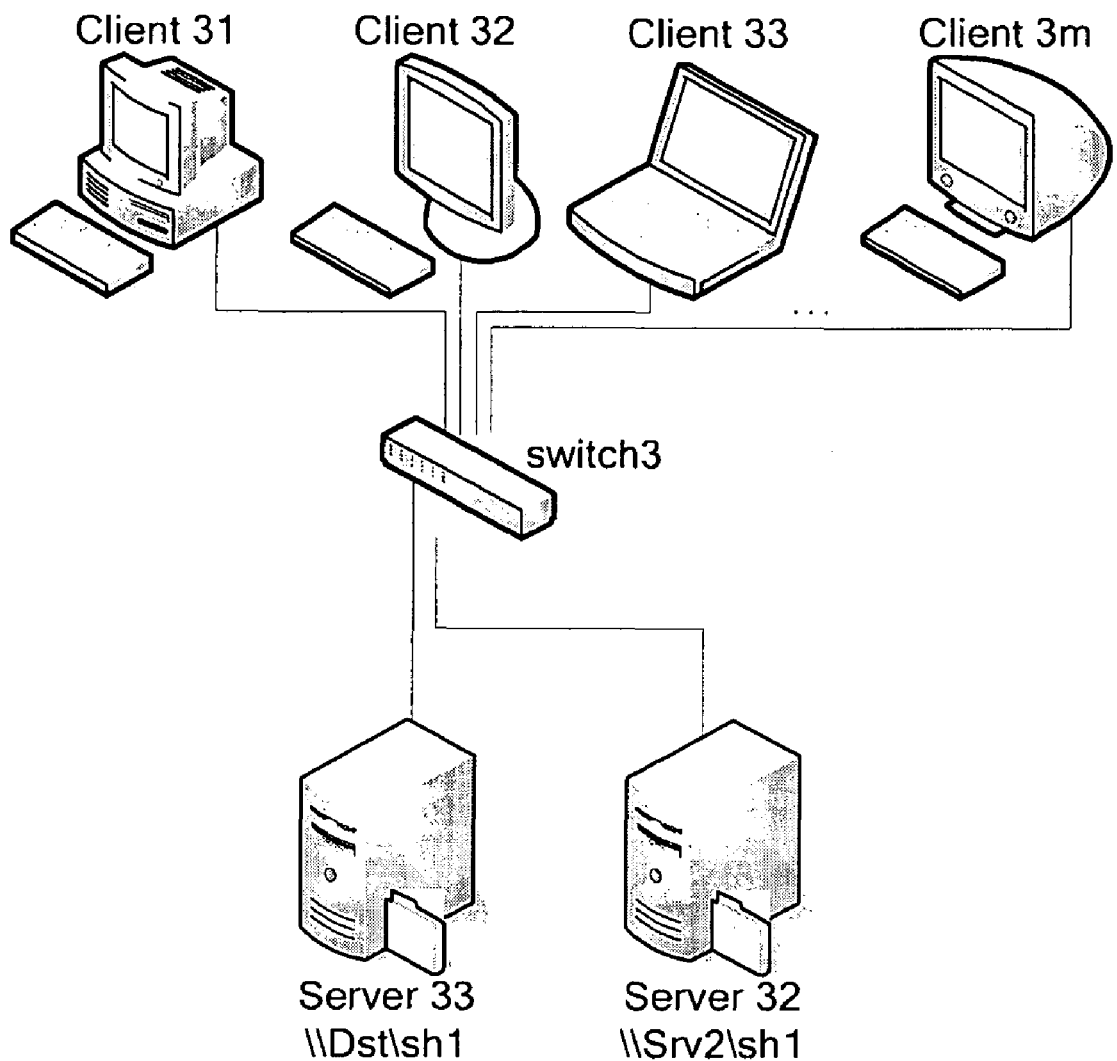
FIG. 3 is a schematic block diagram of a two server system where one of the servers was replaced by the new server after all files were copied from the old one.

FIGS. 1-3 demonstrate how the standard (non-optimized) file migration is done. FIG. 1 is a schematic block diagram of network file system before the beginning of the migration. Client11 to Client1m are regular clients that connect to the two back-end servers (Server11 and Server12) through a regular IP switch over a standard network file system protocol CIFS and/or NFS. When the administrator takes the server offline, he connects it directly to the destination server and begins direct file copy from source (Server21) to the destination (Server23) as depicted in FIG. 2. When all files are copied, the administrator renames the destination server to the name of the source server and finally the administrator connects the destination server in place of the source server as shown in FIG. 3.

Migration with Minimal Interruption

Figure 4:
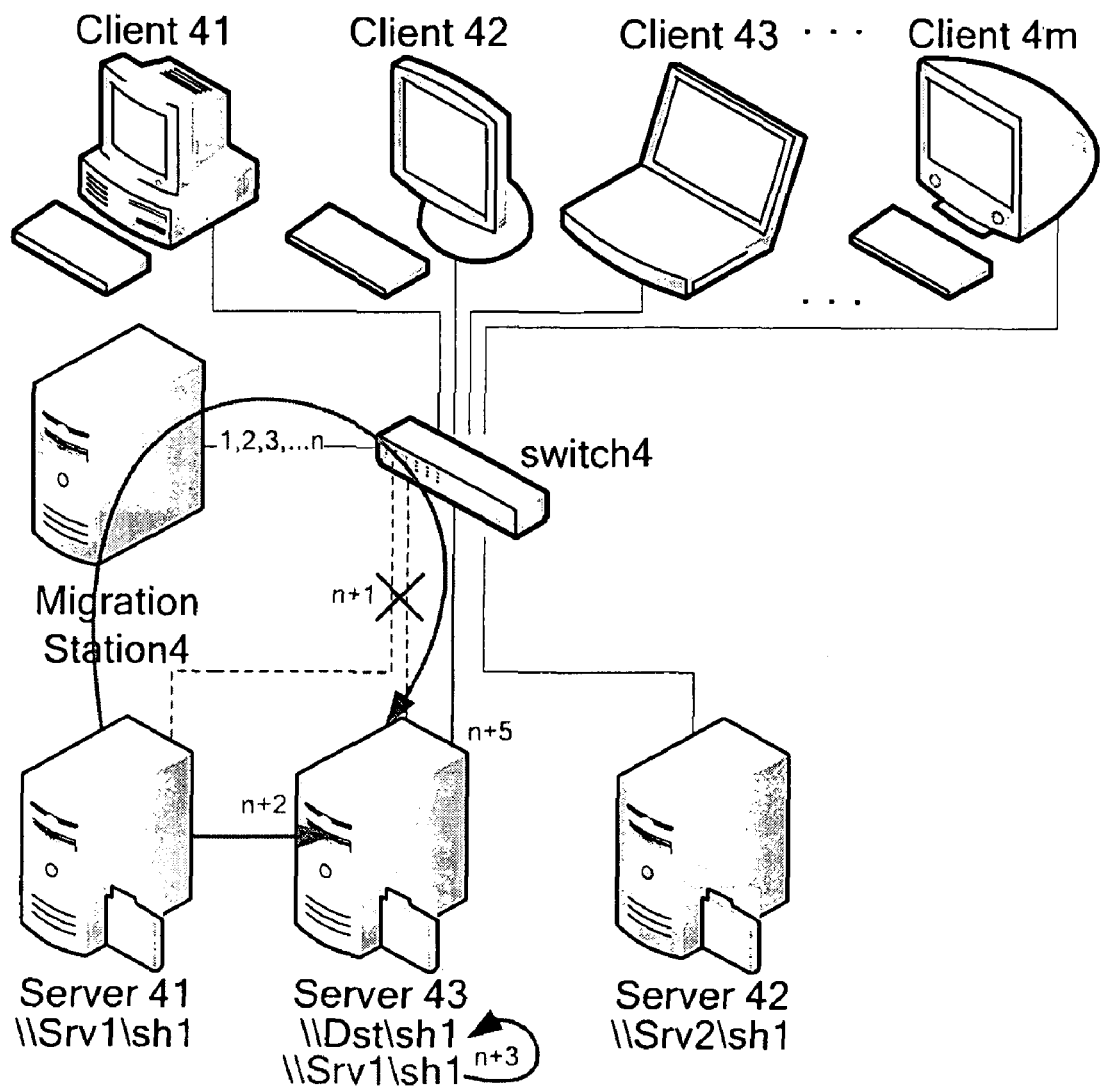
FIG. 4 depicts the process sequence of server migration with minimal interruption.

FIG. 4 depicts the minimal disruption migration. All accessible files are migrated from Server41 to Server43. Since the process can take a long time, some of the files may get changed during migration. In the second step, those files are migrated (again). Step two is repeated until all files are migrated or until the amount of data remaining to be migrated falls under a predetermined amount. Finally, the migration is completed in a way similar to the regular migration: in Step n+1 Server41 and Server43 are taken offline. In step n+2, the remaining files are copied to the destination. In the final step (n+3), the server is renamed to the name of the source server and the destination server is brought on-line (n+4).

Non-Disruptive Migration

For stateful file system protocols, there are two major obstacles for providing non-disruptive migration: files that are constantly been updated and files kept open continuously.

Generally speaking, when a file is constantly updated, the file migration is constantly going to be triggered. If the file is relatively large the migration process will have to start keeping track of the modified regions. Otherwise, the algorithm is never going to be able to catch up with the modifications.

If a file is held open, its sharing mode may not allow the file to be opened by the migration process which will prevent copying the file to the destination server. Normally these limitations can only be overcome by taking the server down while these files are been migrated. For the duration of this migration, the clients suffer a disruption in their ability to access those files.

Figure 8:
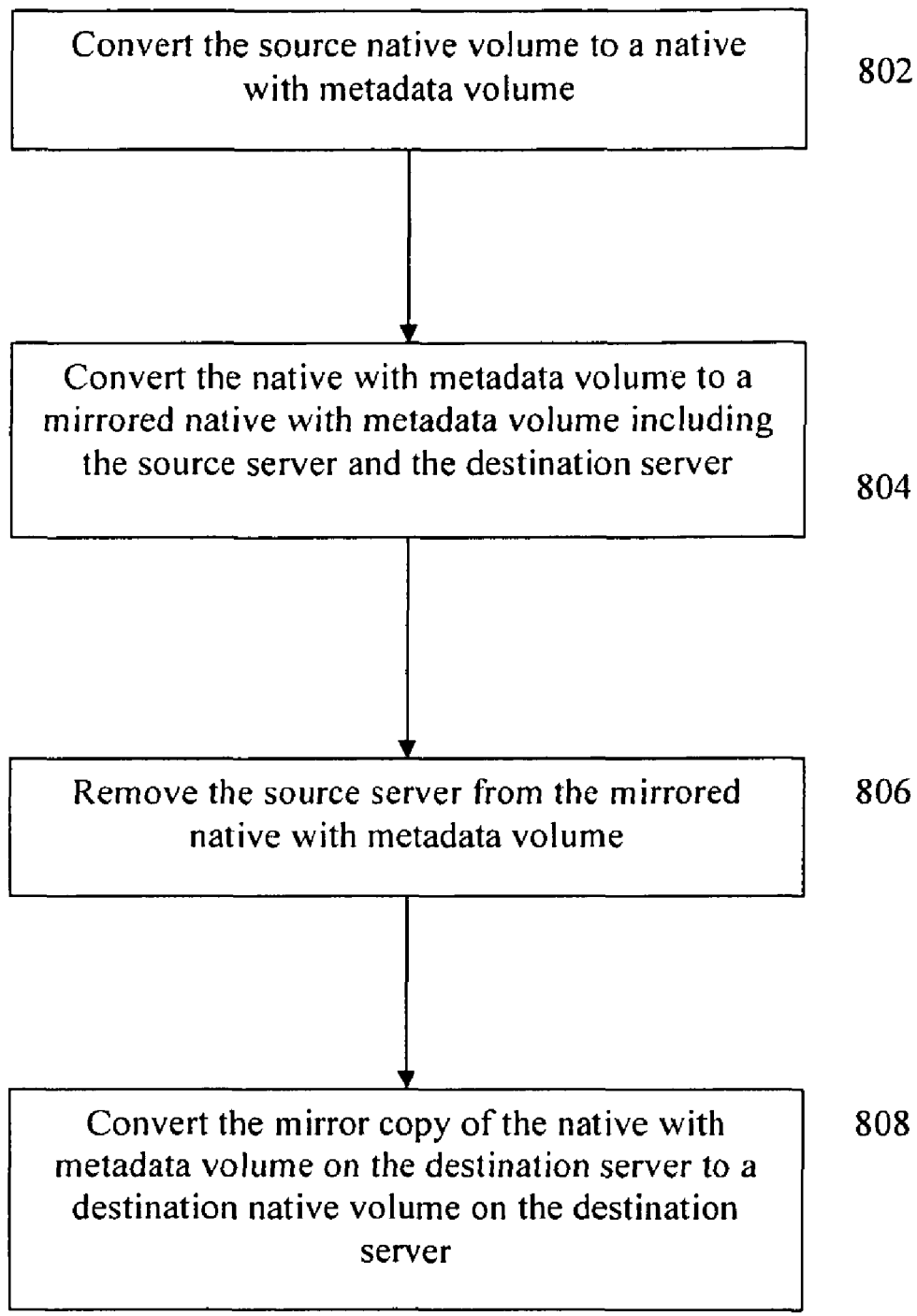
FIG. 8 is a logic flow diagram for non-disruptive file migration by a file switch in accordance with an exemplary embodiment of the present invention.

Embodiments of the present invention described below utilize file virtualization in order to provide non-disruptive file/server migration. As shown in FIG. 8, non-disruptive file migration can be summarized in four general steps:

1) Convert the source server from a Native volume to a Native with metadata volume (block 802).

2) Convert the native with metadata volume to a mirrored native with metadata volume, where the second mirror resides on the destination server (block 804).

3) Convert back to a native with metadata volume by removing the source server from the volume (block 806).

4) Finally, the native volume with metadata is converted to a simple native volume (block 808).

Native Volume

A native volume is a basic virtualized representation of a share from the back-end server. Its content (directories and files) are completely managed by the hosting file server. Clients can access the virtualized volume through the global namespace or directly by accessing the back-end server.

Native Volume with Metadata

A native volume with metadata is a natural extension of the native volume mode with the ability to keep additional metadata information for each file/directory. "The metadata" will keep at least the following information: the number of mirrors and a list of the destinations where the file/directory mirror is placed.

One embodiment of this is where a local NTFS directory is used for storing all information about the native volume. In this case, the whole remote namespace (without the file data) is replicated inside this directory. All file attributes (including security, EA, file size, etc) are preserved on all mirrors as well as in the file switch namespace.

To calculate the actual path of a file, the system replaces the top level file prefix with the one specified in the metadata and leaves the rest of the path unchanged. This operation is very similar to the DFS/MUP operation. FIG. 6 is a practical example of a sample global namespace including the metadata information and how the global name-space is used to calculate the target path.

Mirrored Native Volume with Metadata

"Mirrored Native Volume with Metadata" is similar to the "Native Volume with Metadata" except there are two or more copies of the data. For the purpose of this embodiment, only two copies are used. FIG. 7 is a practical example of a sample global namespace including the metadata information and how the global name-space is used to calculate the target paths.

Basic Operations for (Mirrored) Native Volume with Metadata

CREATE NEW FILE/DIRECTORY—When create operation comes, the operation is performed initially over the file in the Local NTFS drive. If it succeeds, a file metadata is created as well and associated with the file/directory (e.g., stored inside an alternate data stream) and than the operation is forwarded to all mirrors in parallel. When all mirrors complete the operation, the operation is completed back to the client.

OPEN EXISTING FILE/DIRECTORY—When an open operation comes, the operation is performed initially over the local NTFS file. This allows the file security permissions to be evaluated locally and force evaluation of the sharing mode. If it succeeds, the metadata is read, to get the file placement and mirrors after which the open operation is forwarded simultaneously to all mirrors. When all mirrors complete the open, the open operation is completed back to the client.

READ/WRITE OPERATIONS—Data operations are submitted simultaneously to all mirrors with the operation sent to the mirrors in their rank order. When all of them complete the operation is acknowledged to the client. No read/write data is stored on the local disk so there is no need to send data operations to it. RANGE-LOCK OPERATIONS—Advisory range-locks or mandatory range-locks may be implemented. If advisory range-locks are supported, than the range-lock requests are sent only to the local NTFS volume. For mandatory range-locks, the range-lock requests are sent to the local file and after it succeeds it is sent to all mirrors. In this case the local file acts as an arbiter for resolving range-lock conflicts and deadlocks.

OPPORTUNISTIC LOCK (OP-LOCK) OPERATIONS— Oplock operations are submitted to local file and all mirrors in parallel. When (any) oplock breaks, the original client request is completed, although nothing is completed if the oplock level was already lowered. To produce the correct result, an exemplary embodiment starts (initially) with an uninitialized level which is the highest oplock level. From there on, the oplock level can only go down. Please note that it is possible the oplock level on mirror 1 to be broken to level 2 and while we are processing it, the level can be broken to level 0 on mirror 2. If the user acknowledges the break to level 2, it is failed immediately without sending anything to the mirrors. It should be noted that oplock break operations are the only operations that treats status pending as an acknowledgement that the operation completed successfully (i.e., processing it in a work item or from a different thread is unacceptable).

DIRECTORY ENUMERATION—All directory operations are served by the local name space. Since the local directory is a copy of the native directory structure, everything that the client requires is stored there.

DELETE AND RENAME OPERATIONS—The delete/rename operations are sent to the local directory first and after it succeeds it is sent to all file/directory mirrors (in parallel). The operation is completed when all mirrors completes it.

DIRECTORY CHANGE NOTIFICATIONS—Directory operations are submitted to all mirrors. Pass back the response when it comes. If there is no request to be completed, MFM saves the responses in their arrival order. When a new dir-change-notification request comes, it will pick the first pending response and complete it to the client, the next one will pick the next pending and so on. It is possible for the client to receive more than one break notification for the same change—one for the local metadata and one for each of the mirrors. This behavior is acceptable since the directory notifications are advisory and not time sensitive. The worst that can happen is the client will have to reread the state of the affected files. If there is no pending completion, than we submit directory change notification request to all mirrors that have no pending directory notification.

Converting from Native Volume to Native with Metadata Volume

In order to convert the Native Volume to a Native with metadata, all access to the back end server that is being converted will go through the file switch, i.e., the file switch is an in-band device. There should be no file access that does not go through it. A data corruption is possible in case files are been modified/accessed not through the file switch. The file switch cannot not enforce that the access to the backend servers is done only through the file switch.

Conversion from native to extended native is done by walking down the source directory tree and converting the volume directory by directory. Each directory operation usually is run by a single execution thread.

The execution thread opens the source directory, places a batch oplock on the source directory, so it can be notified in case someone changes it. In case the batch oplock is broken, the thread re-adds directory to the end of the list of directories to be processed, releases any resources it has acquired and exits.

Then the corresponding local directory and its metadata are created. The directory is enumerated and for each of the files found a sparse file is created in the local file system. The sparse file size corresponds to the actual file size. All other file attributes (time, attributes, security descriptors and EAs) are copied as well. The creation of "the metadata" for the file completes the conversion of the file.

After file enumeration completes, all directories are enumerated and for each directory found a new work item is created. The work items are added to the list of directories to be converted as a batch when the enumeration is completed. This would ensure that the sub-directory conversion will start only after the parent directory conversion is completed and avoid any nasty concurrency problems. At some point later when the same directory is scheduled again, any files and/or directories that have already been converted (by the previous attempts) would be skipped. This approach, although slow, can guarantee that there would be no missed entities.

The directory oplock break status is checked after processing each directory entity (file and/or directory). The status of the oplock break is not checked during the batch adding of the sub-directories to the directory processing queue since this operation is entirely local and is executed almost instantaneously.

All security descriptors are copied verbatim (without looking into it) except for the top level directory. The root directory security descriptor is converted to effective security descriptor and than set in the local NTFS directory. This would allow the sub-entities to properly inherit their security attributes from their parents.

This process repeats until there are no more entries in the directory list. The number of simultaneously processed directories can be limited to a predefined number to avoid slowing the system down due to over-parallelism. While converting the volume, the in memory structures of the currently opened files and directories maintained by the file switch (FIG. 5) needs to be modified to comply with the requirements of the native with metadata volume structure.

To provide atomicity, some operations may require a temporal suspension of all operations over the affected entity (file or directory). In this case the access to the file/directory is suspended, the system waits for all outstanding operations (except range-locks with timeout) to complete and than it performs the required operation. When the operation completes, with success or a failure, the access to the entity is restored.

Usually, the temporary access suspension is at most several hundreds of milliseconds long, which is comparable to the network latency, and thus would not affect the applications using those files even if they are actively using the opened file.

Operations during Conversion to Native Volume with Metadata

If the file/directory does not have metadata (i.e., it is not converted yet), the operation is forwarded to the native volume otherwise the operations are served way it is described in "Basic Operations for (Mirrored) Native Volume with Metadata" with the following exceptions.

CREATE NEW FILE/DIRECTORY—This operation is performed in the local namespace. If it succeeds, it is processed as described in "Basic Operations for (Mirrored) Native Volume with Metadata." If it fails, the operation is submitted to the native volume and if it succeeds, this is an indication that the local directory has not been created/converted yet. It will be created eventually so there really is nothing to do here.

CONVERTING THE IN-MEMORY RANGE-LOCK STRUCTURES—The range-lock requests can be handled in one of two possible ways: as advisory locks or as mandatory locks (Windows default). If advisory range-locks are supported, access to the file is suspended temporarily, and all range-lock requests are submitted to the local NTFS volume on the File Switch after which all pending requests on the source file are cancelled. Once cancelled access to the file is restored. If mandatory range-locks are supported, access to the file is suspended, and all range-lock requests are submitted to local NTFS volume first, followed by the range-lock requests being submitted to the other file mirrors. After the range-locks are granted, access to the file is restored. While the migration is running, open file and/or directory requests should be submitted in parallel to the local NTFS file system metadata and to the native volume. If the request succeeds on the backend server but fails on the local volume, this is an indication that the file/directory has not been converted yet. In this case, all parent directories inside the Local NTFS volume need to be recreated before the operation is acknowledged to the client.

CONVERTING OPPORTUNISTIC LOCK (OP-LOCK) OPERATIONS—Converting opportunistic lock operations from Native to Native Volume with metadata involves submitting an oplock to the local NTFS volume in order to make it compliant with the expected model.

CONVERTING ACTIVE DIRECTORY ENUMERATION—Since directory operation is a relatively short operation, there really is nothing special that needs to be done here. The operation would be completed eventually and then served the proper way.

RENAME OPERATIONS—There are four different rename operation combinations based on the file conversion state and the destination directory conversion state: both are converted, both are not converted; only the source is converted, and only the destination is converted. Nothing special is needed if both are converted. If the source is converted but the destination directory does not exist in the local NTFS volume, the destination directory is created in the local volume and the rename/move operation is performed on the native volume and on the NTFS volume. If the destination directory is converted, but the local file is not, the file is converted after the rename operation completes. If the destination directory is converted, but the local directory is not, the directory name is added to the list of directories that require conversion. If the source and the destination are not converted, the rename operation is executed over the native volume only. After the operation completed, the destination directory is checked one more time and in case the destination directory suddenly becomes converted, and the entity is a file, metadata is created for it; if the entity is a directory, it is added to the list of directories that require conversion. This behavior is done to ensure that an entity conversion will not be missed.

CONVERTING DIRECTORY CHANGE NOTIFICATIONS—Converting the directory change notifications from Native to Native Volume with metadata involves submitting a directory change notification to the local NTFS volume in order to make it compliant with the expected model.

Creating/Rebuilding Data Mirrors for Native Mode with Metadata Volume

The directory operations and walking the tree is very similar to converting the volume to extended-native mode. For each directory found, a new destination directory is created and all directory attributes are copied there as well.

When the source file is opened for reading, a filter oplock is placed on the local NTFS file (filter oplocks are not supported across the network). If this filter oplock gets broken because someone opened the file, the mirroring process is stopped, the uncompleted mirrors are deleted, and the file is put on a list for later attempts to mirror.

If a file/directory open fails with a sharing violation error, this file/directory is added to list to be processed at some time later when the file is closed or opened with more appropriate sharing mode.

Periodically the list of files with postponed mirroring is checked and the mirroring attempt is repeated.

After several unsuccessful attempts to mirror file data, an open file mirroring is performed. The process starts by creating an empty file where the new mirrors are placed and begins to copy file data. The file data is read sequentially from the beginning of the file until the end of the file and is written to all of the mirrors (please note that no file size increase is allowed during this phase). In addition, all client write (and file size change) requests are replicated and sent to all mirrors. To avoid data corruption, reading the data from the source and writing it to the mirror(s) is performed while user access to this file is suspended. The suspension is once again performed for a relatively small interval so as not be noticed by the user (or application).

When the file is mirrored, the file handle state is propagated to the new mirror as well. This state includes but is not limited to: mirror file handle, range-locks and oplocks. Range-locks are replicated to all mirrors only if mandatory range-locks are supported; otherwise, there is nothing more that needs to be done if only advisory locks are supported.

When a directory is mirrored, any directory change notifications request needs to be resubmitted to the new mirror as well.

Removing the Source Server from the Mirrored Volume

Convert back to a native with metadata volume is done atomically by programmatically setting the source server state to "force-removed", changing a global state to removing a mirror and logging off from the server. All operations pending on this server would be completed by the backend server and the file switch will silently "eat" them without sending any of them to the client.

After this, the source server references can be removed from "the metadata": the directory operations and walking the tree is very similar to the way the data mirrors are rebuild described at "Creating/rebuilding data mirrors for Native mode with Metadata Volume". Only the metadata structure is updated by removing the source server references from "the metadata". Finally, the in-memory data handle structures are updated to remove any references to the source server. All those operations can be performed with no client and/or application disruption.

Converting from Native with Metadata to a Native Volume

Converting starts by going through all currently opened handles and replicating the opened state (e.g. range locks directory notifications, oplocks, etc.) over the native volume.

When done, ALL access to the specified server set is temporarily suspended and all open files/directories on the local NTFS directory are closed (any operations failed/completed due to the close are ignored). The global state of the volume is set to a pure native volume so all new open/creates should go to the native volume only.

Finally, access to the volume is restored.

At this point, the metadata directory can be moved to a separate NTFS directory where all files and directories containing "the metadata" can be deleted and associated resources can be freed.

All those operations are performed with no client and/or application disruption.

It should be noted that terms such as "client," "server," "switch," and "node" may be used herein to describe devices that may be used in certain embodiments of the present invention and should not be construed to limit the present invention to any particular device type unless the context otherwise requires. Thus, a device may include, without limitation, a bridge, router, bridge-router (brouter), switch, node, server, computer, appliance, or other type of device. Such devices typically include one or more network interfaces for communicating over a communication network and a processor (e.g., a microprocessor with memory and other peripherals and/or application-specific hardware) configured accordingly to perform device functions. Communication networks generally may include public and/or private networks; may include local-area, wide-area, metropolitan-area, storage, and/or other types of networks; and may employ communication technologies including, but in no way limited to, analog technologies, digital technologies, optical technologies, wireless technologies (e.g., Bluetooth), networking technologies, and internetworking technologies.

It should also be noted that devices may use communication protocols and messages (e.g., messages created, transmitted, received, stored, and/or processed by the device), and such messages may be conveyed by a communication network or medium. Unless the context otherwise requires, the present invention should not be construed as being limited to any particular communication message type, communication message format, or communication protocol. Thus, a communication message generally may include, without limitation, a frame, packet, datagram, user datagram, cell, or other type of communication message.

It should also be noted that logic flows may be described herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. In a switched file system having a file switch in communication with a plurality of file servers including at least a source server and a destination server, where the source server manages a source native volume, a method for non-disruptive migration of the native volume from the source server to the destination server, the method comprising:
   converting, by the file switch, the source native volume to a native with metadata volume using a local file system managed by the file switch;
   converting, by the file switch, the native with metadata volume to a mirrored native with metadata volume, wherein the converting takes place in both the source server and the destination server, the destination server including a mirror copy of the native with metadata volume;
   removing, by the file switch, the source server from the mirrored native with metadata volume, wherein the removing includes physically deleting and disconnecting the source server from the mirrored native with metadata volume; and
   converting, by the file switch, the mirror copy of the native with metadata volume on the destination server to a destination native volume on the destination server.

2. A method according to claim 1, wherein converting the source native volume to the native with metadata volume comprises:
   for each source directory in the source native volume, creating a corresponding local directory in the local file system including metadata associated with the source directory copied from the source native volume; and
   for each source file in the source native volume, creating a corresponding local sparse file in the local file system including file attributes copied from the source native volume but excluding the file contents associated with the source file.

3. A method according to claim 2, wherein the metadata associated with the source directory copied from the source native volume comprises directory security descriptors.

4. A method according to claim 2, wherein creating a local directory for a source directory comprises:
   opening the source directory in the source native volume;
   placing a lock on the source directory; and
   creating the local directory and its metadata.

5. A method according to claim 1, wherein converting the native with metadata volume to the mirrored native with metadata volume comprises:
   for each local directory, creating a corresponding destination directory in the destination server and maintaining a mapping of the local directory to a source directory pathname for the corresponding source directory in the source server and to a destination directory pathname for the corresponding destination directory in the destination server;
   for each local file, creating a corresponding destination file in the destination server including file data copied from the source native volume and maintaining a mapping of the local file to a source file pathname for the corresponding source file in the source server and to a destination file pathname for the corresponding destination file in the destination server.

6. A method according to claim 5, wherein each mapping includes an indicator of the number of servers associated with the mirrored native with metadata volume.

7. A method according to claim 5, wherein removing the source server from the mirrored native with metadata volume comprises:
   disabling usage of the source destination pathnames and the source file pathnames.

8. A method according to claim 5, wherein converting the mirror copy of the native with metadata volume on the destination server to a destination native volume comprises:
   replicating state information for the destination directories and the destination files from the source native volume;
   disabling usage of the local directories and local files; and
   advertising the destination directories and destination files as a native volume.

9. A method according to claim 8, wherein converting the mirror copy of the native with metadata volume on the destination server to a destination native volume further comprises:
   deleting unneeded metadata associated with the mirror copy of the native with metadata volume from the destination server.

10. A file switch for non-disruptive file migration in a switched file system having a plurality of file servers including at least a source server and a destination server, where the source server manages a source native volume, the file switch comprising:
   a network interface for communication with the file servers;
   a processor coupled to the network interface; and
   a memory coupled to the processor, wherein the processor is configured to execute programmed instructions stored in the memory comprising:
      converting the source native volume to a native with metadata volume using a local file system managed by the file switch;
      converting , the native with metadata volume to a mirrored native with metadata volume, wherein the converting takes place in both the source server and the destination server, the destination server including a mirror copy of the native with metadata volume;
      removing the source server from the mirrored native with metadata volume, wherein the removing includes physically deleting and disconnecting the source server from the mirrored native with metadata volume; and
      converting the mirror copy of the native with metadata volume on the destination server to a destination native volume on the destination server.

11. A file switch according to claim 10, wherein the processor is further configured to execute program instructions stored in the memory further comprising converting the source native volume to the native with metadata volume by:
   creating, for each source directory in the source native volume, a corresponding local directory in the local file system including metadata associated with the source directory copied from the source native volume; and
   creating, for each source file in the source native volume, a corresponding local sparse file in the local file system including file attributes copied from the source native volume but excluding the file contents associated with the source file.

12. A file switch according to claim 11, wherein the metadata associated with the source directory copied from the source native volume comprises directory security descriptors.

13. A file switch according to claim 11, wherein the processor is further configured to execute program instructions stored in the memory further comprising creating a local directory for a source directory by opening the source directory in the source native volume; placing a lock on the source directory; and creating the local directory and its metadata.

14. A file switch according to claim 10, wherein the processor is further configured to execute program instructions stored in the memory further comprising converting the native with metadata volume to the mirrored native with metadata volume by:
   creating, for each local directory, a corresponding destination directory in the destination server and maintaining a mapping of the local directory to a source directory pathname for the corresponding source directory in the source server and to a destination directory pathname for the corresponding destination directory in the destination server; and
   creating, for each local file, a corresponding destination file in the destination server including file data copied from the source native volume and maintaining a mapping of the local file to a source file pathname for the corresponding source file in the source server and to a destination file pathname for the corresponding destination file in the destination server.

15. A file switch according to claim 14, wherein each mapping includes an indicator of the number of servers associated with the mirrored native with metadata volume.

16. A file switch according to claim 14, wherein the processor is further configured to execute program instructions stored in the memory further comprising removing the source server from the mirrored native with metadata volume by disabling usage of the source destination pathnames and the source file pathnames.

17. A file switch according to claim 14, wherein the processor is further configured to execute program instructions stored in the memory further comprising:
   converting the mirror copy of the native with metadata volume on the destination server to a destination native volume by replicating state information for the destination directories and the destination files from the source native volume;
   disabling usage of the local directories and local files; and
   advertising the destination directories and destination files as a native volume.

18. A file switch according to claim 17, wherein the processor is further configured to execute program instructions stored in the memory further comprising converting the mirror copy of the native with metadata volume on the destination server to a destination native volume further by deleting unneeded metadata associated with the mirror copy of the native with metadata volume from the destination server.

19. A non-transitory computer readable medium having stored thereon instructions for non-disruptive file migration in a switched file system having a plurality of file servers, including at least a source server and a destination server, where the source server manages a source native volume, comprising machine executable code which when executed by at least one processor, causes the processor to perform steps comprising:
   converting the source native volume to a native with metadata volume using a local file system;
   converting the native with metadata volume to a mirrored native with metadata volume, wherein the converting takes place in both the source server and the destination server, the destination server including a mirror copy of the native with metadata volume;
   removing the source server from the mirrored native with metadata volume, wherein the removing includes physically deleting and disconnecting the source server from the mirrored native with metadata volume; and
   converting the mirror copy of the native with metadata volume on the destination server to a destination native volume on the destination server.

20. A medium according to claim 19, further having stored thereon instructions that when executed by the at least one processor causes the at least one processor to perform steps further comprising:
   creating, for each source directory in the source native volume, a corresponding local directory in the local file system including metadata associated with the source directory copied from the source native volume; and
   creating, for each source file in the source native volume, a corresponding local sparse file in the local file system including file attributes copied from the source native volume but excluding the file contents associated with the source file.

21. A medium according to claim 20, wherein the metadata associated with the source directory copied from the source native volume comprises directory security descriptors.

22. A medium according to claim 20, further having stored thereon instructions that when executed by the at least one processor causes the at least one processor to perform steps further comprising creating a local directory for a source directory by opening the source directory in the source native volume; placing a lock on the source directory; and creating the local directory and its metadata.

23. A medium according to claim 19, further having stored thereon instructions that when executed by the at least one processor causes the at least one processor to perform steps further comprising converting the native with metadata volume to the mirrored native with metadata volume by:
   creating, for each local directory, a corresponding destination directory in the destination server and maintaining a mapping of the local directory to a source directory pathname for the corresponding source directory in the source server and to a destination directory pathname for the corresponding destination directory in the destination server; and
   creating, for each local file, a corresponding destination file in the destination server including file data copied from the source native volume and maintaining a mapping of the local file to a source file pathname for the corresponding source file in the source server and to a destination file pathname for the corresponding destination file in the destination server.

24. A medium according to claim 23, wherein each mapping includes an indicator of the number of servers associated with the mirrored native with metadata volume.

25. A medium according to claim 23 further having stored thereon instructions that when executed by the at least one processor causes the at least one processor to perform steps further comprising removing the source server from the mirrored native with metadata volume by disabling usage of the source destination pathnames and the source file pathnames.

26. A medium according to claim 23, further having stored thereon instructions that when executed by the at least one processor causes the at least one processor to perform steps further comprising:
   converting the mirror copy of the native with metadata volume on the destination server to a destination native volume by replicating state information for the destination directories and the destination files from the source native volume;
   disabling usage of the local directories and local files; and advertising the destination directories and destination files as a native volume.

27. A medium according to claim 26, further having stored thereon instructions that when executed by the at least one processor causes the at least one processor to perform steps further comprising converting the mirror copy of the native with metadata volume on the destination server to a destination native volume further by deleting unneeded metadata associated with the mirror copy of the native with metadata volume from the destination server.

* * * * *